United States Patent
Numata

(10) Patent No.: US 6,980,733 B2
(45) Date of Patent: Dec. 27, 2005

(54) METHOD FOR MOVING IMAGE PLAYBACK AND APPARATUS THEREFOR

(75) Inventor: Kohji Numata, Tokyo (JP)

(73) Assignee: NEC Corporation, Tokyo (JP)

( * ) Notice: Subject to any disclaimer, the term of this patent is extended or adjusted under 35 U.S.C. 154(b) by 928 days.

(21) Appl. No.: 09/822,269

(22) Filed: Apr. 2, 2001

(65) Prior Publication Data

US 2001/0028790 A1 Oct. 11, 2001

(30) Foreign Application Priority Data

Apr. 3, 2000 (JP) ........................................ 2000-100396

(51) Int. Cl.$^7$ ............................................... H04N 5/91
(52) U.S. Cl. ........................ 386/131; 386/125; 348/441
(58) Field of Search ................. 386/1, 46, 45, 386/125, 126, 131; 345/441, 448, 4

(56) References Cited

U.S. PATENT DOCUMENTS

| | | | | |
|---|---|---|---|---|
| 5,999,220 A | * | 12/1999 | Washino | ................ 348/441 |
| 6,069,664 A | * | 5/2000 | Zhu et al. | ................ 348/441 |
| 6,380,978 B1 | * | 4/2002 | Adams et al. | ............. 348/448 |
| 6,385,240 B2 | * | 5/2002 | Nishio | ..................... 386/131 |
| 6,542,198 B1 | * | 4/2003 | Hung et al. | ................ 348/448 |

FOREIGN PATENT DOCUMENTS

| | | |
|---|---|---|
| JP | 1-164181 | 6/1989 |
| JP | 5-91467 | 4/1993 |
| JP | 10-322621 | 12/1998 |
| JP | 2984247 | 9/1999 |
| JP | 11-262016 | 9/1999 |

* cited by examiner

*Primary Examiner*—James J. Groody
*Assistant Examiner*—Christopher Onuaku
(74) *Attorney, Agent, or Firm*—McGinn IP Law Group, PLLC

(57) ABSTRACT

Image data is sequentially read out in units of frames from a storage apparatus storing NTSC images, divided into even and odd fields for each frame, and stored into a frame buffer. A judgment is made as to whether the even field of the currently read-out frame is the same image as the even field of the immediately previous frame, and if the images are the same image data is read out without a judgment being made for 4 frames starting from the next frame and 1 frame is removed so as to form a frame from the odd field of the currently read-out frame and the even field of the next read-out frame, a non-interlaced display being made at an interval of $\frac{1}{24}$ for 4 the next 4 four frames that include this frame.

15 Claims, 5 Drawing Sheets

METHOD FOR MOVING IMAGE PLAYBACK AND APPARATUS THEREFOR

BACKGROUND OF THE INVENTION

1. Field of the Invention

The present invention relates to a method for moving image reproduction, and more particularly to a method for moving image reproduction for the purpose of display of NTSC format image data obtained as 32 pull-down from an image of a movie as an non-interlaced image on a display.

2. Related Art

In order to view a moving image recorded on a projection film such as a movie on a home-type television, it is necessary to convert the images of each frame of the projection film to, for example, an image signal of the NTSC system (National Television System Committee color system) such as used in television broadcasting and the like. A film is usually played back as a continuous moving image by projecting 24 frames of images each second. For this reason, for a movie the image is updated every $1/24$ second. In contrast to this, in the NTSC system there are 30 frames displayed every 1 second, and the images of each frame are divided up into even-numbered fields and odd-numbered fields and updated every $1/60$ second. For this reason, if a frame of a movie is simply converted to an NTSC format on a one-to-one basis, the recorded time will be shortened by 20% in comparison with the normal amount of time.

For example, there are 144 frames (24 frames×60 seconds) in 1 minute of a movie, and if these are assigned as is to 30 frames/second in the NTSC system, the movie would end in 48 seconds, and the movement would be too fast. For this reason, in the case of converting a movie to an NTSC system film, as shown in FIGS. 6 (a) and (b), a method of conversion known as 32 pull-down, in which 1 frame of a move is converted alternately to 2 fields or 3 fields. This is done because if 5 fields are generated for 2 frames, 24 frames will become exactly 60 fields. FIG. 6 (a) shows a movie comprising image frames Film 01 to Film 05 which are updated every $1/24$ second, and FIG. 6 (b) shows an NTSC system movie updated every $1/60$ second, divided into even and odd fields.

With increasing usage of personal computers in recent years, discs onto which NTSC formatted movies have been recorded as image data are being played back and viewed using personal computers. In this case, because the display of the personal computer displays in a non-interlaced manner, in the case of using a personal computer to play back a disc intended for playback in the NTSC format, such as a DVD-Video disc, image data for 1 frame is generated from odd and even field data, and the moving image is played back by updating the image every $1/30$ second.

In the case in which the original image is a movie, however, because the recorded image data is subjected to 32 pull-down processing, if this image data is converted to a non-interlaced display for each frame individually, the following problems occur.

The first problem is that, as shown at Frame 03 and Frame 04 in FIG. 6(c), there is a shift that appears between fields in the played back picture. The second problem is that, as show in FIG. 6(a) to FIG. 6(c), after Film 01 is displayed as Frame 01, Film 02, until the time that Film 02 is displayed as Frame 02, there is a time period of $1/30$ second, whereas after Film 02 is displayed as Frame 02, until Film 04 is displayed as Frame 05 there is a time period of $3/30$, although there should be a time period of $2/30$ second, meaning that the image is not played back with uniform time intervals.

Accordingly, it is an object of the present invention to provide an apparatus and a method for playing back NTSC format image data recorded with 32 pull-down processing, such as a movie, as a moving image without time shift on a non-interlaced type display

SUMMARY OF THE INVENTION

To achieve the above-noted objects, the present invention adopts the following basic technical constitution.

Specifically, a method for playback of a moving image according to the present invention that solves the above-noted problems sequentially reads image data from a recording medium, onto which the image data has been recorded after conversion of a NTSC system images into digital data, in units of frames, divides the read-out image data into even and odd fields for each fame individually, and makes a judgment as to whether or not an image of an even field in a currently read-out frame is the same image as that of an even field in an immediately previously read-out even frame, making a non-interlaced display of the currently read-out frame at an interval of $1/30$ in the case in which the judgment was that the images were not the same, and reading image data without making a judgment for 4 frames from the next frame to be read out when the judgment was that the images were the same, and further forming one frame from the odd fields of the currently read-out frame and the even fields of the next frame read out, so that 2 frames are reduced to 1 frame, and 4 frames including this frame being displayed in non-interlaced manner at an interval of $1/24$ second.

In one exemplary configuration of this moving image playback method, the image data recorded on the recording medium is compressed and encoded, and is decoded at the time of readout.

In this case, in one example configuration of the image data recorded onto the recording medium, an interframe prediction method is used to perform compression and encoding, data representing the difference value with respect to the immediately previous frame and data representing the vector of the part that has moved from the immediately previous frame being included therewithin, and a judgment being made that the images are the same if these data in the even fields of read-out frames are within a prescribed value.

In another exemplary configuration of a method for playback of a moving image according to the present invention, two temporary storage means are provided, which store read-out frames divided into even and odd fields, storage being performed alternately each time a frame is read out, a comparison is made of an even field of an immediately previously read-out frame stored in a temporary storage means with an even field of a currently read-out frame, the non-interlaced display being made by reading out image data from the temporary storage means, into which has been stored even and odd fields from the currently read-out frame, and only in the case in which the images are the same the image data of the next frame is read out and the temporary storage means, into which is stored the immediately previous frame, is overwritten, image data being read out and displayed from the odd field of the temporary storage means into which is stored the currently read-out frame and the even field of the temporary storage means into which is stored the next frame.

In yet another exemplary configuration of a method for playback of a moving image according to the present invention, a temporary storage means is provided, into which is stored a read-out frame, divided into an even field and an odd field, a non-interlaced display being made by reading out from the temporary storage means image data from an even field of a read-out frame and an odd field of a read-out frame, and only in the case in which these are the same image, after storing only the odd field of the currently read-out frame as the odd field in the temporary storage means, image data of the next frame is read out and only the even field thereof is stored as the even field in the temporary storage means, the image data being read out from the temporary storage means after these fields are stored.

An example of a moving image playback apparatus according to the present invention has a storage apparatus, which reads out image data from a recording medium onto which is recorded image data that has been converted from NTSC system image data to digital data, a video decoding section, which sequentially reads out image data from the storage medium, via the storage apparatus, in units of frames and outputs this read-out image data, divided into even and odd fields for each frame individually, an image storage switch, which alternately switches the output destination of the video decoding section for each frame, a frame buffer, which is connected to the video decoding section via the image storage buffer switch, and which has two memories, which store image data output by the video decoding section, an image comparison section, which compares even fields stored in the two memories of the frame buffer and which judges the images to be the same when a difference between the two fields is within a prescribed value and outputs the result of this judgment, a display buffer switch, which, based on the judgment results of the image comparison section, selects one each of the even and odd fields from the two memories of the frame buffer, and a display controller, which reads out image data from the even and odd fields selected by the display buffer switch and outputs a non-interlaced type of signal, wherein the display buffer switch has input to it the judgment results and only in the case in which the images are judged to be the same, after the memory storing the frame of the immediately previous read-out frame is overwritten by image data of the next frame, the odd field of the memory storing the currently read-out frame and the even field of the memory storing the next frame are selected, and wherein in other cases the even and odd fields of the memory storing the currently read-out frame are selected, the display controller being configured to input the judgment results and so that the display interval for each frame is made $1/24$ second for 4 frames from the time the judgment is made that the images are the same, this interval being made $1/30$ second at other times.

Another aspect of a moving image playback apparatus according to the present invention has a storage apparatus, which stores image data that has been converted from NTSC system images to digital data and then compressed and encoded using an interframe prediction method, this data including data that represents a difference value with respect to an immediately previous frame and data that represents the vector of a part of the frame that has moved from the immediately previous frame, a video decoding section, which sequentially reads out image data from the storage medium, via the storage apparatus, and which decodes the image data, separating the data into even and odd fields and then outputting the data, a same-image judgment section, which judges that images are the same when either the data expressing the difference value with respect to the immediately previous frame or the data representing the vector of the part that has moved from the immediately previous frame in the even field of a read-out frame is within a prescribed value, and which outputs the result of this judgment, a frame buffer having a memory, which stores image data output by the video decoding section, divided into even and odd fields, and a display controller, which reads out even and odd fields stored in the memory of the frame buffer and outputs a non-interlaced type of signal, wherein the video decoding section is configured so that only when a judgment is made that the images are the same is made by the same-image judgment section only the odd field of the currently read-out frame is decoded and output to the memory, after which the next frame image data is read an the even field only is decoded and output to the memory, and wherein the display controller is configured so as to input the judgment results and to make the display interval between each frame $1/24$ second for 4 frames from the time the judgment is made that the images are the same, this interval being made $1/30$ second at other times.

DETAILED DESCRIPTION OF THE PREFERRED EMBODIMENTS

Embodiments of the present invention are described in detail below, with references made to relevant accompanying drawings.

Figure 1:
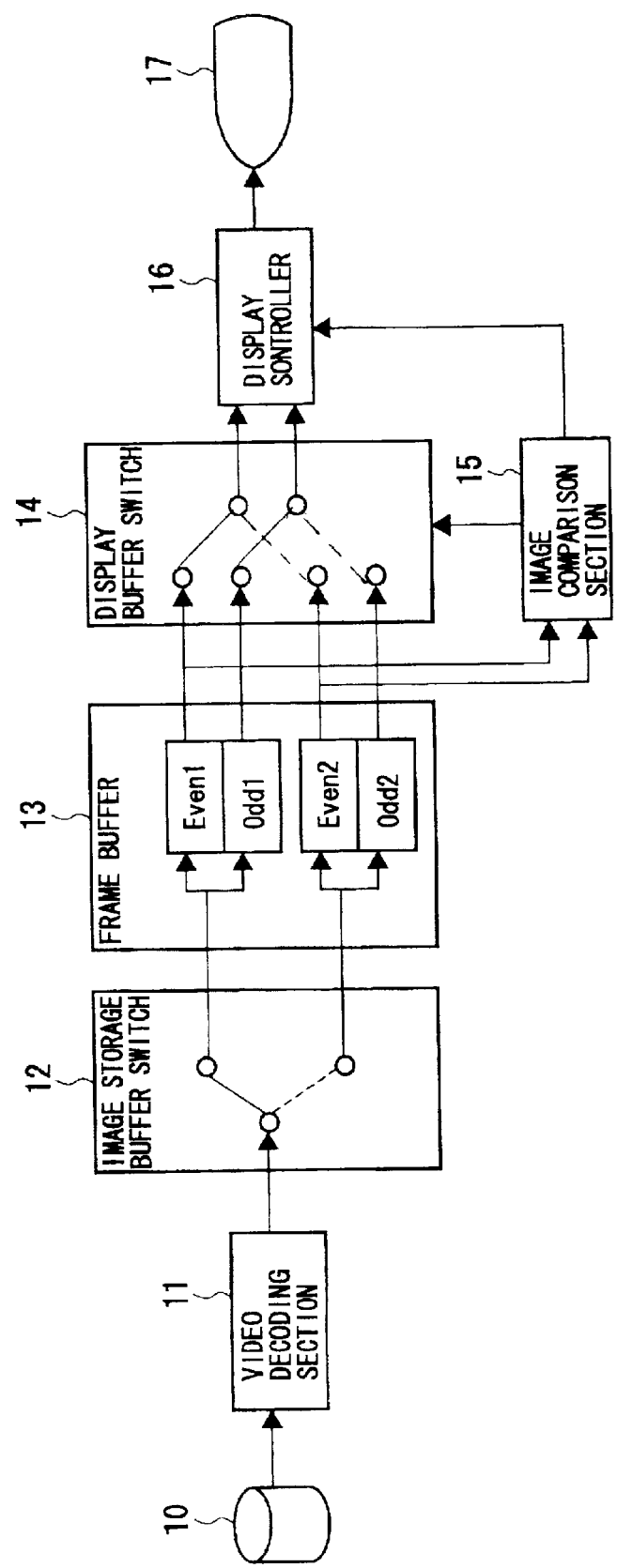
FIG. 1 is a block diagram showing the configuration of a moving image playback apparatus to which a method for playing back a moving image according to a first embodiment of the present invention is applied.

A first embodiment of a moving image playback apparatus according to the present invention will be described first, making references to relevant drawings. Specifically, FIG. 1 is a block diagram showing the configuration of a moving image playback apparatus to which a method for playing back a moving image according to a first embodiment of the present invention is applied. Referring to FIG. 1, this moving image playback apparatus is has a storage apparatus 10, a video decoding section 11, an image storage buffer switch 12, a frame buffer 13, a display buffer switch 14, an image comparison section 15, and a display controller 16.

The storage apparatus 10 is configured so as to read out NTSC image data obtained by processing 24 frame/second images from a movie or the like by the 32 pull-down method and then performing conversion to digital data and stored onto a recording medium. In this case, although the digitized NTSC image data is compressed and encoded using the MPEP (Moving Picture Experts Group) system or the like, it will be understood that it is alternately possible to leave the data uncompressed. The recording medium used by the storage apparatus 10 can be a semiconductor memory, a magnetic disk, a magnetic tape, a magneto-optical disk, or an optical disk, and can be either a medium that is built into the storage apparatus 10 or a medium that is removed therefrom. It can further be a playback only medium, or a writable medium.

The video decoding section 11 decodes compressed image data from the storage apparatus 10 one frame at a time, separates the decoded image data into even and odd fields, and outputs the data. In the case of non-compressed data, output is done by dividing the data into even and odd fields, without decoding the data. The frame buffer 13 has two memories for the purpose of storing image data output from the video decoding section 11, each memory being formed by even field buffers (Even1 and Even2) for storage of even fields of image data and odd field buffers (Odd1 and Odd2) for storage of odd fields of image data.

So that the frame buffer 13 always stores image data that was read out and decoded immediately previously and the currently read-out and decoded image data, the image storage buffer switch 12, each time 1 frame of image data is read out and decoded, the storage destination for image data output from the video decoding section 11 is alternately switched between the two memories of the frame buffer 13. The image comparison section 15 compares the image data stored in the two even field buffers (Even1 and Even2) within the frame buffer 13 and makes a judgment as to whether or not the images are the same, outputting the result of this comparison to the display buffer switch 14 and to the display controller 16.

The display buffer switch 14, based on the judgment result of the image comparison section 15, selects from the buffer 13 buffers for even fields to be displayed (Even1 and Even2) and the buffers for odd fields to be displayed (Odd1 and Odd2). The display controller 16 reads image data from the even field buffers (Even1 and Even2) and the odd field buffers (Odd1 and Odd2) from the frame buffer 13 using the display buffer switch 14 and outputs a non-interlaced type of signal to a display device 17. The display controller 16, based on the judgment result of the image comparison section 15, performs control so that the display interval for each frame of image data is either $1/30$ second or $1/24$ second. In this case, the interval is made $1/24$ second for 4 frames from the time that a judgment is made that the images are the same, and the interval is made $1/30$ second at other times. The display device 17 is a non-interlaced type display that accommodates intervals of both $1/30$ second and $1/24$ second.

Figure 2:
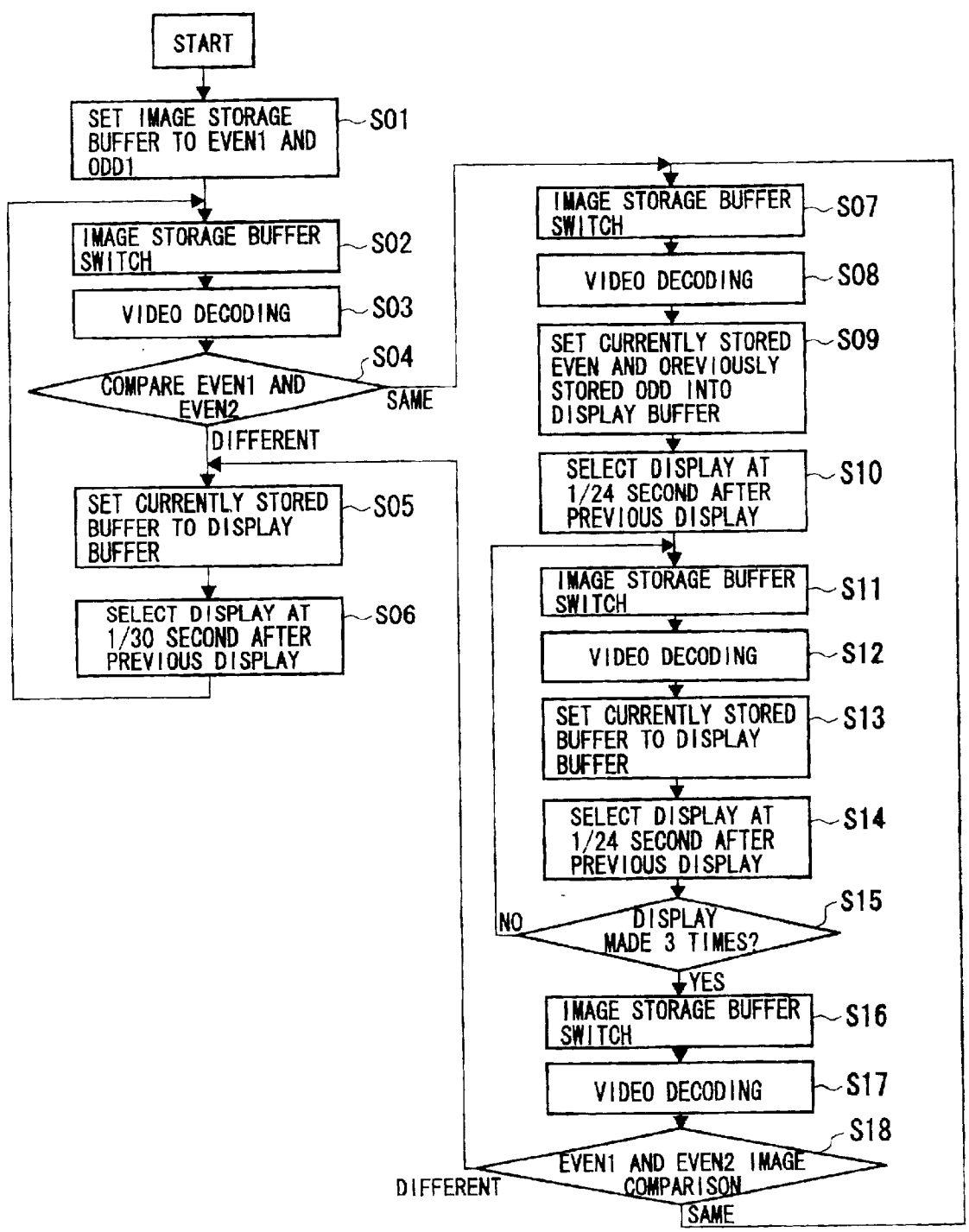
FIG. 2 is a flowchart illustrating the operation of the moving image playback apparatus of FIG. 1.
Figure 3:
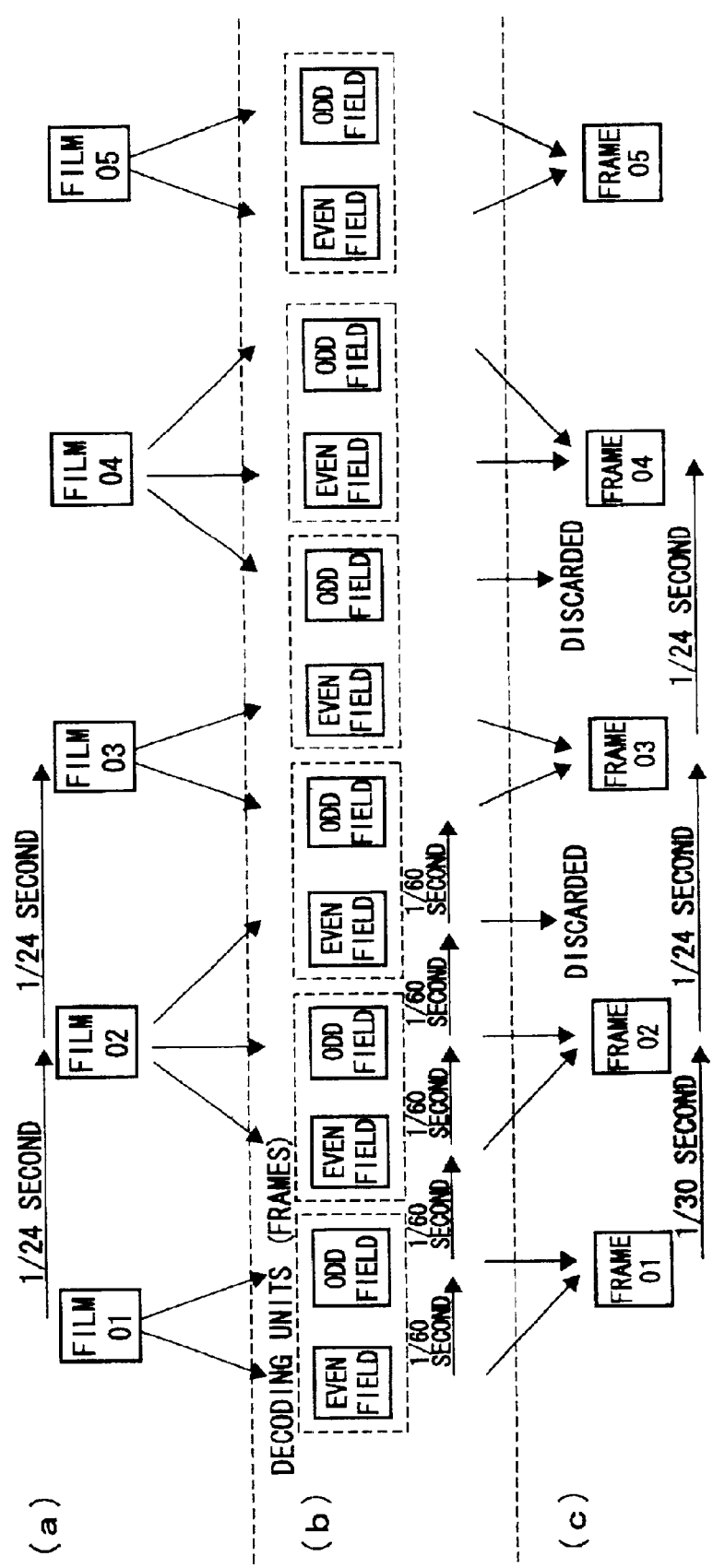
FIG. 3 is a drawing illustrating a method for playing back a moving image according to the present invention.

The operation of this embodiment of the present invention is described below, with references made to FIG. 1 to FIG. 3. In FIG. 2, at step S01 the image storage buffer switch 12 is set to Even1 and Odd1 of the frame buffer 13.

At step S02, the image storage buffer switch 12 is switched to the reverse direction, in which case it is switched at first to Even2 and Odd2.

At step S03, video decoding is performed. In this case, the video decoding section 11 reads in compressed image data from the storage apparatus 10 and, after 1 frame of image data is decoded, the decoded image data is divided into an even field and an odd field and output, this being stored into an even field buffer and an odd field buffer that are selected by the image storage buffer switch 12.

At step S04, the image comparison section 15 compares the even field data stored this time with the even field data stored the previous time, that is, the data within Even1 and the data within Even2. At the image comparison section 15, when comparing the image data even if the data do not completely coincide, if they are the same values to a certain degree, the judgment is made that they are the same. This is done because noise or compression errors occurring when converting to digital data after 32 pull-down can prevent decoded data from being exactly the same.

In the case in which the image comparison section 15 judges that the images are not the same, because this indicates that the currently played back image was originally NTSC data, processing starting at step S05 is performed so as to cause updating at an interval of $1/30$ second. In the case of a judgment at the image comparison section 15 that the images are the same, because this indicates that the currently played back image was originally NTSC data subjected to 32 pull-down processing, processing starting at step S07 is perform so as to cause updating at an interval of $1/24$ second. By doing this, it is possible to distinguish BTSC data that has been subjected to 32 pull-down processing.

In the case in which a judgment is made by the image comparison section 15 that the images are not the same, the display buffer switch 14 is switched at step S05, so that the current storage buffer is set to the display buffer, and at step S06 the display controller 16 is set so as to make a display at $1/30$ second after the previously displayed image. After this return is made to step S02, from which processing is continued until the selected image is completed.

In the case in which a judgment is made by the image comparison section 15 that the images are the same, rather than displaying the currently decoded image immediately, display is made by adjusting to the next image data that is decoded. First, at step S07 the image storage buffer switch 12 is switched to the reverse direction. At step S08, the video decoding section 11 reads in compressed image data from the storage apparatus 10 and decodes 1 frame of this data, dividing it between an even field (Even) and an odd field (Odd). At step S09, the currently stored even field (Even) data and the previously stored odd field (Odd) field data are set in the display buffer, and at step S10 the display controller 16 is set so that the display is made at $1/24$ second after the previously displayed image.

In steps S11 through S14, image decoding is performed in the same manner as in steps S01 through S06, except that comparison is not performed, the display controller 16 being set so as to make the display interval $1/24$ second. The processing from step S11 to step S14 is performed 3 times, so that 3 frames are displayed at an interval of $1/24$ second. At step S15, a test is performed to see whether the display of 3 frames has been completed, and processing proceeds to step S16 and thereafter if this display has been completed.

At steps S16 through S18, image decoding is performed in the same manner as in steps S02 through S04, and the images are compared once again by the image comparison section 15. In this case, if the judgment is made that the images are the same, because this indicates, as noted earlier, that the images are NTSC data subjected to 32 pull-down processing, the processing of step S07 and thereafter is performed. If the judgment is made that the images are not the same, however, because this was data that was originally NTSC data, processing from step S05 is performed, so that the image is updated at an interval of $1/30$ second.

By performing the above-described processing, as shown in FIG. 3(c), an unnecessary frame is removed from a frame in which an offset has occurred in NTSC data subjected to 32 pull-down processing so as to generate a frame that is the same as the original frame, and furthermore the updating of the images is done with the same time interval as the original picture, the result being a smooth playback of the picture. Additionally, because it is possible to make a judgment with regard to the images at a fixed interval during playback and switch field removal processing and the updating interval, even if picture editing is done and there is intermixing of data that is originally NTSC data and image data that has been subjected to 32 pull-down processing, it is possible to achieve smooth playback.

Figure 4:
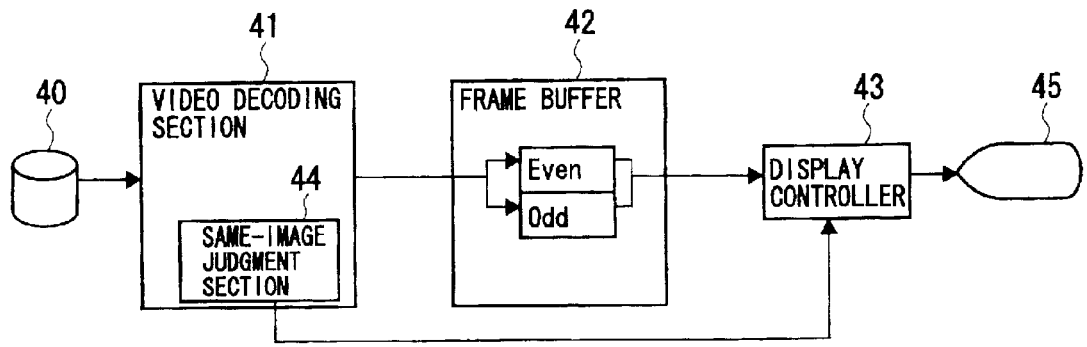
FIG. 4 is a block diagram showing the configuration of a moving image playback apparatus to which a method for playing back a moving image according to a second embodiment of the present invention is applied.

A second embodiment of a method for playing back a moving image according to the present invention is applied only in the case in which NTSC image data has been subjected to compressing and encoding in accordance with MPEG or the like. FIG. 4 is a block diagram showing the configuration of a moving image playback apparatus to which this method for moving image playback has been applied. Referring to FIG. 4, this moving image playback apparatus has a storage apparatus 40, a video decoding section 41, a frame buffer 42, and a display controller 43, and is further provided with a same-image judgment section 44 within the video decoding section 41. The output of this moving image playback apparatus is connected to a display device 45.

The storage apparatus 40 is the same as in the first embodiment, and is configured so as to read out from a recording medium, onto which compressed and encoded NTSC image data that has been recorded, encoded and compressed NTSC image data. The video decoding section 41 reads in the compressed and encoded image data from the storage apparatus 40, and decodes the data 1 frame at a time. In compression according to the MPEG system or the like, because the data includes compressed data of the difference value with respect to a previous frame and data representing the vector of the moved part of a frame, the same-image judgment section 44 checks these data during decoding, and if the difference value with respect to the previous frame is small, and the amount of movement is small, a judgment is made that the images are the same.

The judgment is only performed with regard to an even field within a frame, and if a judgment is made that the images are the same, storage is done into the odd field buffer (Odd) within the frame buffer 42. If the judgment is made that the images are the same when performing the previous frame decoding, the only the even field is decoded, and storage is done into the even field buffer (Even) within the frame buffer 42. If the judgment is made that the images are not the same when performing decoding, the even and odd fields are decoded, and are stored respectively in the even field buffer (Even) and odd field buffer (Odd) of the frame buffer 42.

The display controller 43 reads out the image data of the even field buffer (Even) and the odd field buffer (Odd) of the frame buffer 42 and outputs a signal accommodating a non-interlaced display system. The display controller 43, based on the judgment results of the same-image judgment section 44 within the video decoding section 41, performs control to that the display interval for each frame of image data is made either 1/30 second or 1/24 second. In this case, the interval is made 1/24 for 4 frames from the time that the judgment is made that the image are the same, with the interval made 1/30 second at other times. The display device is the same as in the first embodiment, and will therefore not be explicitly described herein.

Figure 5:
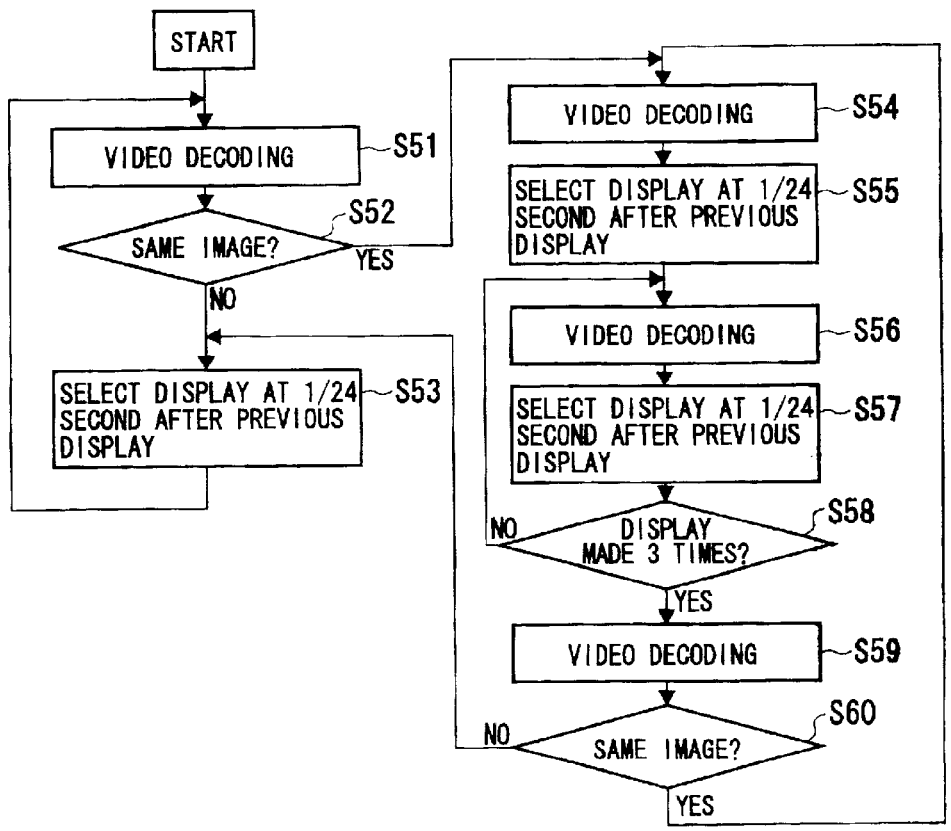
FIG. 5 is a flowchart illustrating the operation of the moving image playback apparatus of FIG. 4.
Figure 6:
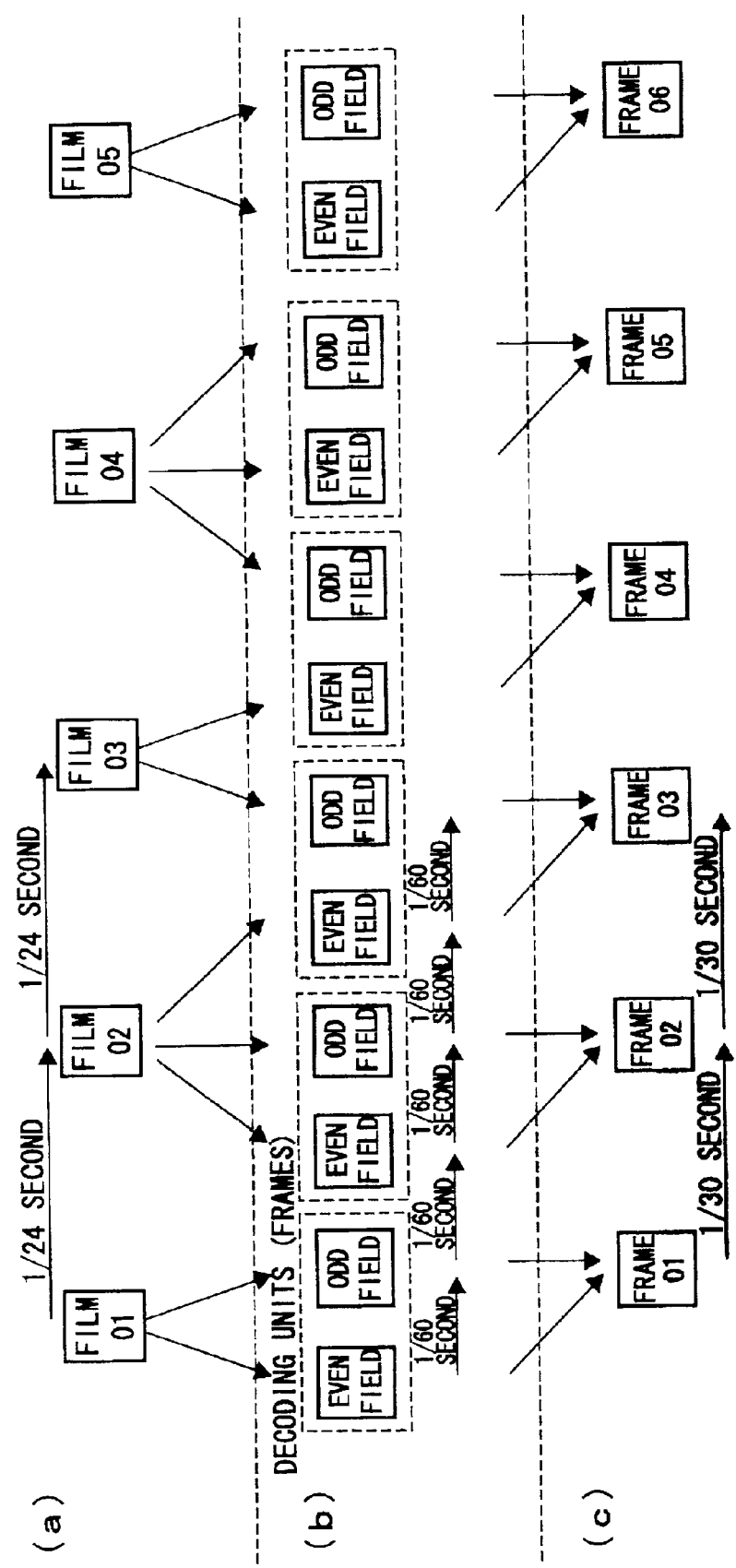
FIG. 6 is a drawing illustrating a method for playing back a moving image of the past.

FIG. 4 to FIG. 5 illustrate the operation of this embodiment of the present invention.

Referring to FIG. 5, at step S51 the video decoding section 41 reads in 1 frame of compressed image data from the storage apparatus 40, and the same-image judgment section 44 makes a judgment with regard to the even field of the read-in data as to whether the image is the same, from data compressed data of the difference value with respect to the immediately previous frame, or from data representing the vector of the part of the frame that moved with respect to the immediately previous frame.

In this case, if the difference value between the immediately previous frame and the frame being decoded is small and the movement is only a small amount, a judgment is made that the images are the same, in which case only the odd field data is stored in the odd field buffer (Odd). If the judgment is that the images are not the same, the image for 1 frame is decoded and divided into two fields, the even and odd field data being stored in the even field buffer (Even) and odd field buffer (Odd), respectively. Step S52 is a branch at which a judgment with regard to whether the images are the same, and if the judgment is that the images are not the same, at step S53 the display controller 43 is set so that the display is made 1/30 second after the previous image display. After that, return is made to step S51, from which processing is continued until the selected image is completed.

If the judgment is that the images are the same, at step S54 the video decoding section 41 reads in compressed image data for 1 frame from the storage apparatus 40, and decodes only the even field, storing this in the even field buffer (Even). At step S55, the display controller 43 is set so that the display is made 1/24 second after the previous image display. Steps S56 and S57 perform the same image decoding as steps S51 to S53. In this case, however, the image judgment is not performed, the display controller 43 being set so that the display interval is made 1/24 second. The processing of steps S56 and S57 is performed 3 times, so that 3 frames are displayed at an interval of 1/30 second.

At step S58, a test is performed to see whether the display of 3 frames has been completed, and processing proceeds to step S59 if this display has been completed. At steps S59 and S60, image decoding and image judgment are performed in the same manner as in steps S51 and S52. In this case, if the judgment is made that the images are the same, because this indicates that the images are NTSC data subjected to 32 pull-down processing, the processing of step S54 and thereafter is performed. If the judgment is made that the images are not the same, however, because this was data that was originally NTSC data, processing from S53 is performed, so that the image is updated at an interval of 1/30 second.

This embodiment achieves the same type of effect as the first embodiment. Additionally, by using he data included in compressed data in accordance with the MPEG system or the like, which includes compressed data of the difference value with respect to the previous frame or data representing the vector of the moved part with respect to the previous frame, there is no need to hold data from the previous frame for the purpose of comparison, thereby achieving the effect of simplification of the circuit configuration.

As described in detail above, a method for playing back a moving image according to the present invention, sequentially reads image data from a recording medium, onto which the image data has been recorded after conversion of a NTSC system images into digital data, in units of frames, divides the read-out image data into even and odd fields for each fame individually, and makes a judgment as to whether or not the a currently read-out frame even field is the same image as the immediately previously read-out even field, making a non-interlaced display of the currently read-out frame at an interval of 1/30 in the case in which the judgment was that the images were not the same, and reading image data without making a judgment for 4 frames from the next frame to be read out when the judgment was that the images were the same, and further forming one frame from the odd fields of the currently read-out frame and the even fields of the next frame read out, so that 2 frames are reduced to 1 frame, with 4 frames including this frame being displayed in non-interlaced manner at an interval of 1/24 second, the result being that an unwanted frame is removed from NTSC data subjected to 32 pull-down processing so as to generate 24 frames per second that are the same as the original frame, and to create a smooth image display. Additionally, because an image judgment is performed during playback, even if picture editing is done and there is intermixing of data that is originally NTSC data and image data that has been subjected to 32 pull-down processing, it is possible to achieve smooth playback by distinguishing each time of image data. Furthermore, because only two fields are removed and not displayed as a result of image judgment, and because the others have the same grouping of even and odd fields for decoding as the grouping of even and odd fields for display, even if an erroneous image judgment occurs, the lost image is only 2 fields (1 frame), so that thereby achieving the effect of reducing the influence on the image quality.

What is claimed is:

1. A method for playback of a moving in which an NTSC format image data obtained as 3:2 pull-down from an image of a movie is displayed as a non-interlaced image on a display, said method comprising:
   sequentially reading image data from a recording medium, onto which said image data has been recorded after conversion of an NTSC system image into digital data, in units of frames;
   dividing said read-out image data into even and odd fields for each frame individually;
   judging whether or not an image of an even field in a currently read-out frame is the said image as that of an image of an even field in an immediately previously read-out frame;
   making a non-interlaced display of the image at a predetermined first time interval in the case in which said judgement was made that images were not the same;
   reading image data without making said judgment for a predetermined number of successive frames to be read out including said currently read-out frame when said judgement was that images were the same;
   forming one frame from an odd field of a currently read-out frame and an even field of the next frame to be read out, so as to reduce the number of frames with respect to each of said predetermined number of successive frames; and
   making a non-interlaced display of said frames obtained from said predetermined number of successive frames at a predetermined second time interval being different from said first time interval.

2. A method for playback of a moving image according to claim 1, further comprising:
   sequentially reading image data from a recording medium, onto which said image data has been recorded after conversion of an NTSC system image into digital data, in units of frames;
   dividing said read-out image data into even and odd fields for each frame indivually;
   judging whether or not an image of an even field in currently read-out frame is the same image as that of an image of an even field in an immediately previously read-out frame;
   making a non-interlaced display of the currently read-out frame at an interval of 1/30 as said first time interval in the case in which a judgement was made that images were not the same, and reading image data without making a judgement for 4 frames from the next frame to be read out when a judgement was that images were the same; and
   forming one frame from odd fields of a currently read-out frame and even fields of a next frame to be read out, so that 2 frames are reduced to 1 frame and with 4 frames including said frame being displayed in a non-interlaced manner at an interval of 1/24 second as said second time interval.

3. A method for playback of a moving according to claim 2, wherein said image data recorded on said recording medium is compressed and encoded, and is decoded at the time of readout.

4. A method for playback of a moving image according to claim 2, wherein a determination whether or not images are the same to each other is performed in such a way that two temporary storage means are provided, which store each one of even and odd fields respectively which being divided from a frame read-out, storage being performed alternately each time when a frame is read out, a comparison being made of an even field of an immediately previous read-out frame stored in said temporary storage means and an even field currently read out, a non-interlaced display being performed by reading out and displaying image data from said temporary storage means, into which is stored even and odd fields of a currently read-out frame, and only in a case in which images are judged to be the same, image data of the next frame is read out and overwritten in said temporary storage means that stores an immediately previous frame, after which image data being read out from an odd field of said temporary storage means storing the currently read-out frame and an even field of said temporary storage means storing the next frame displayed.

5. A method for playback of a moving image according to claim 1, wherein said image data recorded on said recording medium is compressed and encoded, and is decoded at the time of readout.

6. A method for playback of a moving image according to claim 5, wherein said image data recorded on said recording medium is compressed and encoded using an interframe prediction method and includes data representing a difference value with respect to a previous frame or data representing a vector of a movement with respect to a previous frame, and
   wherein a judgement is made that images are the same when data in an even field of a read-out frame is within a prescribed value.

7. A method for playback of a moving image according to claim 6, wherein a temporary storage means storing even and odd fields of a read-out frame which being divided from said frame, respectively, and
   wherein a non-interlaced display is carried out by reading out and displaying image data from said temporary storage means storing even and odd fields of a read-out frame, and only when a judgement is made that images are the same, only an odd field of the currently read-out frame is stored in an odd field in said temporary storage means, after which image data for a next frame is read out and only the even field is stored in the even field of said temporary storage means, and after these are stored, image data is read out from said temporary storage means.

8. A method for playback of a moving image according to claim 5, wherein a determination whether or not images are the same to each other is performed in such a way that two temporary storage means are provided, which store each one of even and odd fields respectively which being divided from a frame read-out, storage being performed alternately each time when a frame is read out, a comparison being made of an even field of an immediately previous read-out frame stored in said temporary storage means and an even field currently read out, a non-interlaced display being performed by reading out and displaying image data from said temporary storage means, into which is stored even and odd fields of a currently read-out frame, and only in a case in which images are judged to be the same, image data of the next frame is read out and overwritten in said temporary storage means that stores an immediately previous frame, after which image data being read out from an odd field of said temporary storage means storing the currently read-out frame and an even field of said temporary storage means storing the next frame and displayed.

9. A method for playback of a moving image according to claim 1, wherein a determination whether or not images are the same to each other is performed in such a way that two temporary storage means are provided, which store each one of even and odd fields respectively which being divided from a frame read-out, storage being performed alternately each time when a frame is read out, a comparison being made of an even field of an immediately previous read-out frame stored in said temporary storage means and an even field currently read out, a non-interlaced display being performed by reading out and displaying image data from said temporary storage means, into which is stored even and odd fields of a currently read-out frame, and only in case in which images are judged to be the same, image data of the next frame is read out and overwritten in said temporary storage means that stores an immediately previous frame, after which data being read out from an odd field of said temporary storage means storing the currently read-out frame and an even field of said temporary storage means storing the next frame and displayed.

10. A moving image playback apparatus, comprising:
a storing apparatus, which reads out image data from a recording medium onto which is recorded image data converted from NTSC system image data to digital data;
a video decoding section, which sequentially reads out image data from said storage medium, via the storage apparatus, in units of frames, and outputs said read-out image data by dividing each one of said frames into even and odd fields, individually;
an image storage buffer switch, which alternately switches an output destination of said video decoding section for each frame;
a frame buffer, which is connected to said video decoding section via said image storage buffer switch, and which includes two memories, which store image data output by said video decoding section by dividing said image data of each one of said frames into that of an even field and an odd field, respectively;
an image comparison section, which compares the respective even fields stored in said each one of two memories of said frame buffer with each other and which judges images to be the same when a difference between two even fields is within a prescribed value and outputs a result of said judgement;
a display buffer switch, which, based on judgement results of said image comparison section, selects one of said even fields and one of said odd fields from said two memories of said frame buffer; and a display controller, which reads out image data from said even and odd fields selected by said display buffer switch respectively and outputs a non-interlaced type of signal,
wherein said display buffer switch has input to it said judgement results and only in a case in which said images are judged to be the same, after said memory storing said frame of an immediately previous read-out is overwritten by image data of a next frame, an odd field of said memory storing said currently read-out frame and an even field of said memory storing said next frame are selected, and
wherein in other cases even and odd fields of said memory storing said currently read-out frame are selected, said display controller being configured to input said judgment results and so that a display interval for each frame is made at a second interval time for a predetermined number of frames from a time said judgment is made that said images are the same, while said interval being made at a first interval time at other times.

11. A moving image playback apparatus according to claim 10, wherein said first interval time is 1/30 second and said second interval time is 1/24 second.

12. A moving image playback apparatus according to claim 10, wherein said predetermined number of frames is four.

13. A moving image playback apparatus, comprising:
a storing apparatus, which stores image darta that has been converted from NTSC system images to digital data and then compressed and encoded using an inter-frame prediction method, and which reads out image data from a recording medium which stores data including data that represents a difference value with respect to an immediately previous frame or data that represents a vector of a part of said frame that has moved from said immediately previous frame;
a video decoding section, which sequentially reads out image data from said storage medium, via said storage apparatus, and which decodes said image data, separating said data into even and odd fields and then outputting said data;
a same-image judgement section, which judges that images are the same when either said data expressing said difference value with respect to said immediately previous frame, or said data representing said vector of said part that has moved from said immediately previous frame in said even field of a read-out frame is within a prescribed value, and which outputsa result of said judgement;
a frame buffer having a memory, which stores image data output by said video decoding section, in a form of even and odd fields, respectively which are divided from said frame thus read out; and
a display controller, which reads out even and odd fields stored in said memory of the frame buffer and outputs a non-interlaced type of signal,
wherein said video decoding section is configured so that only when a judgmenet that said images are the same is made by said same-image judgement section only said odd field of said currently read-out frame is decoded and output to said memory, after which the next frame image data is read and the even field is only decoded and output to said memory, and wherein said display controller is configured so as to input said judgement results and to make a display interval formed between every successive two frames, at a second interval time for predetermined number of successive frames counted from the time judgement is made that said images are the same, while this interval being made at a first interval time at other conditions.

14. A moving image playback apparatus according to claim 13, wherein said first interval time is 1/30 second and second interval time is 1/24 second.

15. A moving image playback apparatus according to claim 13, wherein said predetermined number of frames is four.

* * * * *